United States Patent
Higuchi et al.

[15] 3,676,549
[45] July 11, 1972

[54] ADMINISTRATION OF ALKALI METAL SALTS OF SALICYLAMIDE

[72] Inventors: Takeru Higuchi, Anwar Hussian, both of Lawrence, Kans. 66044

[73] Assignee: Alza Corporation

[22] Filed: Sept. 30, 1970

[21] Appl. No.: 77,010

Related U.S. Application Data

[63] Continuation-in-part of Ser. No. 22,049, March 23, 1970.

[52] U.S. Cl. ................................................424/44, 424/230
[51] Int. Cl. ...........................................................A61k 9/00
[58] Field of Search ............................................424/44, 230

[56] References Cited

UNITED STATES PATENTS 2,904,469  9/1959  Nashed...................................424/80
3,136,692  6/1964  Bandelin..................................424/44

OTHER PUBLICATIONS

Bates T. R. et al., J. Pharm. Sci. 58:1468– 1470 Dec. 1969 " Correlation Between the Rate of Dissolution and Absorption of Salicylamide from Tablet and Suspension Dosage Forms"

*Primary Examiner*—Shep K. Rose
*Attorney*—Steven D. Goldby and Paul L. Sabatine

[57] ABSTRACT

Aqueous solutions of alkali metal salts of salicylamide are orally administered with significantly improved analgesic, anti-inflammatory, antipyretic and sedative results, as compared with solid oral dosage forms of both salicylamide and the alkali or alkaline earth metal salts of salicylamide. The solutions are formed by dissolving in water an effervescent composition comprised of a unit dosage amount of an alkali metal salt of salicylamide.

2 Claims, No Drawings

ADMINISTRATION OF ALKALI METAL SALTS OF SALICYLAMIDE

CROSS REFERENCE TO RELATED APPLICATION

Takeru Higuchi copending application Ser. No. 22,049, filed Mar. 23, 1970, and assigned to the assignee of the present invention.

BACKGROUND OF THE INVENTION

This invention relates to the administration of aqueous solutions of a unit dosage amount of an alkali metal salt of salicylamide for use as an analgesic, antipyretic, anti-inflammatory, or sedative, and more especially, to the administration of such solutions formed from an effervescent composition which can be granular, a capsule, a pill or a compressed tablet.

Salicylamide is widely used in analgesic, anti-inflammatory, and antipyretic preparations. There are many conflicting reports, however, as to the efficacy of this drug. Salicylamide is a relatively insoluble drug, having a water solubility of only 0.2 percent at 30° C. When orally administered from tablets or capsules, a substantial amount of salicylamide fails to dissolve during passage through the gastrointestinal tract and can be recovered in the feces. Often as much as one-third of the drug is lost in this manner.

Additionally, a significant portion of the salicylamide which does go into solution is conjugated during absorption through the intestinal walls to its glucuronide and sulfate derivatives, neither of which has the desired pharmacological activity. Thus, very little of the salicylamide orally administered in solid dosage forms reaches the blood stream in active form.

When administered intravenously, salicylamide elicits excellent analgesic, anti-inflammatory, antipyretic and sedative responses. The relative strength of these responses is dose dependent. Because intravenous administration is impractical for most conditions of use, a need existed for a means of orally administering effective amounts of salicylamide.

In the aforementioned copending application, Ser. No. 22,049, the disclosure of which is hereby incorporated by reference and is relied upon, there is described and claimed a means of orally administering effective amounts of salicylamide. The invention of said copending application resides in an orally administratable dosage unit for use as an analgesic, antipyretic, anti-inflammatory, or sedative comprising a unit dosage amount of an alkali or alkaline earth metal salt of salicylamide in an orally acceptable solid pharmaceutical carrier. In accordance with such invention, it was found that oral administration of alkali and alkaline earth metal salts of salicylamide from solid dosage forms, e.g., tablets, pills, powders or capsules, provides therapeutically effective blood levels of salicylamide, substantially higher than when salicylamide itself is administered. Dosage forms containing these salicylamide salts have greater usefulness as analgesics, antipyretics, anti-inflammatories and sedatives than do similar dosage forms containing salicylamide. Moreover, the two long recognized major problems with oral salicylamide administration, namely, insolubility and conjugation during absorption, are both improved upon by the oral administration of these salts. Thus, alkali and alkaline earth metal salts of salicylamide dissolve substantially completely in the gastro-intestinal tract and are readily available for absorption, eliminating the problem of the drug simply passing through the gastrointestinal tract. And, significantly, the greater availability of the drug to the wall of the small intestine overcomes the problem of inactivation by conjugation during absorption. This is especially true when the dosage unit is provided with an enteric coating that resists solution in gastric fluids but disintegrates in the small intestine. Through use of an enteric coating, the highly soluble salicylamide salt is presented to a relatively small area of the intestinal wall in high concentration. By presenting a quantity of drug higher than that which can be conjugated by the means available, the bulk of the salicylamide salt is absorbed in a free state. Thus, the large quantity of salicylamide salt presented to a small segment of the small intestine wall tends to overwhelm or swamp the inactivation mechanism.

While the orally administratable dosage unit of the aforesaid copending application represents a marked advance in the art, it has now unexpectedly been found that oral administration of an aqueous solution of an alkali metal salt of salicylamide, formed from an effervescent composition comprised of a unit dosage amount of the salt, provides significant further improvement in therapy, permitting much more rapid absorption and action, and hence still higher therapeutically effective blood levels of salicylamide.

SUMMARY OF THE INVENTION

It is, therefore, a primary object of this invention to provide an effervescent composition which, when completely dissolved in water and orally ingested, finds use as an analgesic, anti-inflammatory, antipyretic or sedative.

Another object of this invention is to provide an effervescent composition for effectively administering salicylamide.

Still another object of this invention is a significant improvement in salicylamide therapy by orally administering a sparkling aqueous solution of an alkali metal salt of salicylamide.

In attaining the objects of this invention, one feature resides in an effervescent composition comprised of a unit dosage amount of an alkali metal salt of salicylamide in an orally acceptable, solid pharmaceutical effervescent couple. This composition is dissolved in water to produce an effervescing aqueous solution for use as an analgesic, antipyretic, anti-inflammatory or sedative.

Other objects, features and advantages of this invention will become more apparent to those skilled in the art from the detailed description of the invention which follows.

DESCRIPTION OF THE INVENTION

In accordance with this invention, it has been found that by orally ingesting as by drinking an effervescing solution of a unit dosage amount of an alkali metal salt of salicylamide, therapeutically effective blood levels of salicylamide are attained, substantially higher than when salicylamide itself is administered and even significantly higher than when its alkali and alkaline earth metal salts are administered in solid oral dosage forms. Dosage forms containing the alkali metal salicylamide salts and characterized by the effervescent feature have far greater usefulness as analgesics, antipyretics, anti-inflammatories, and sedatives than do solid oral dosage forms containing salicylamide or the alkali and alkaline earth metal salts thereof and not characterized by an effervescent feature.

Salts useful in the present invention can be represented by the formula:

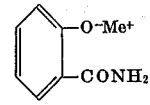

where Me is an alkali metal cation.

Suitable salts of the above formula are those which do not form insoluble salts with agents in the effervescent composition, resulting in sedimentation and eventual precipitation of the salicylamide. Various pharmaceutically acceptable alkali metal salts of salicylamide can be administered from solution. Of these, the sodium and potassium salts are preferred. Best results are obtained with the sodium salt.

While the orally administratable dosage unit of copending application, Ser. No. 22,049 improves upon both the problem of insolubility and conjugation during absorption, the present invention goes even further by providing a means whereby aqueous solutions of alkali metal salts of salicylamide are directly available for absorption.

The effervescent composition of the invention, whether granular, a compressed tablet, a pill or a capsule, is prepared in a conventional manner from a mixture of an effervescent couple, an alkali metal salt of salicylamide, and a nucleating inhibitor.

The effervescent couple of the effervescent composition consists of at least one each of a solid acid and a solid basic material which when dissolved in water reacts with one another to produce carbon dioxide, $CO_2$, which causes effervescence. The acid can be an organic acid such as malic, fumaric, tartaric, itaconic, maleic, citric, succinic, malonic or mesaconic acid, and mixtures thereof, or a corresponding anhydride such as itaconic anhydride and citriconic anhydride, and it can be an inorganic acid such as acid sodium phosphate, sulfamic acid or a phosphonic acid derivative such as disclosed in U.S. Pat. No. 3,325,357. The basic material can be any of the metal carbonate salts such as alkali or alkaline earth metal carbonates and bicarbonates, and mixtures thereof. Examples of such materials are: lithium, sodium, potassium, magnesium and calcium carbonates or bicarbonates. The combination of certain of these acids and bases results in much more rapid effervescence when placed in water than do other members of the above groups. In particular, either citric acid, or a mixture of citric and tartaric acids, and sodium bicarbonate constitute a preferred couple due to their rapid reaction and consequent effervescence.

It will be understood that the range of solid acid and solid basic materials in the effervescent compositions of this invention is rather wide. Inasmuch as the exact proportions, or any particular acid or base, are not necessary, they may be widely varied to suit the exigencies of the occasion. The effervescent couple, however, is of course substantially stoichiometrically balanced to produce an essentially neutral combination.

The effervescent compositions can additionally contain conventional additives such as diluents, binders, lubricants, disintegrators, and coloring agents. Typical diluents include dicalcium phosphate, calcium sulfate, lactose, kaolin, mannitol, dry starch, and powdered sugar. Typical binders include starch, gelatin, sugars such as sucrose, molasses, and lactose, natural and synthetic gums such as acacia, sodium alginate, extract of Irish moss, carboxymethylcellulose, methylcellulose, and polyvinylpyrrolidone, polyethylene glycol, ethylcellulose, and waxes. Typical lubricants for use in these dosage forms include boric acid, sodium benzoate, sodium acetate, sodium chloride, leucine, and polyethylene glycol. Disintegrators which can be present include such agents as starch, methylcellulose, agar, bentonite, cellulose and wood products, alginic acid, guar gum, citrus pulp carboxymethylcellulose, and sodium lauryl sulfate. If desired, conventional pharmaceutically acceptable dyes can be incorporated in the dosage unit.

One important feature of the effervescent composition is that it should contain a nucleating inhibitor, for example, polyvinylpyrrolidone, methylcellulose, or gelatin, which nucleating inhibitor acts to prevent the salicylamide salt from converting in solution to the free acid which would precipitate out. Other suitable nucleating inhibitors would be obvious to those skilled in the art. The amount of nucleating inhibitor incorporated in the effervescent composition is not critical and can vary widely. Typically, however, the nucleating inhibitor comprises from between about 0.1 percent to about 2.0 percent, by weight, of the formulation.

As hereinbefore mentioned, the effervescent composition, whether granular, a compressed tablet, a pill or a capsule, is prepared in a conventional manner. Those skilled in the art are well aware of the standard techniques which can be used to prepare these solid dosage forms.

Alkali metal salicylamide salts are administered according to this invention in the same unit dose amounts conventionally used with salicylamide. In general each dosage unit for eliciting the desired pharmacological response contains from 50 milligrams to 2 grams of the salicylamide salt. Typically, about 300 milligrams are incorporated in the dosage unit. Usual daily dosage of the alkali metal salicylamide salts also corresponds to that conventionally associated with salicylamide as set forth in the National Formulary, Thirteenth Edition, pages 627 and 628, 1970, published by the American Pharmaceutical Association, Washington, D.C., namely, up to a total of no more than about 15 grams.

Alkali metal salicylamide salts can be administered in conjunction with other drugs to obtain enhanced efficacy. When this is done, the amount of the alkali metal salicylamide salt in the dosage unit can vary from the ranges previously set forth and the amount to be administered can be readily determined by those skilled in the art. Typical of other drugs that can be combined with the alkali metal salts of salicylamide to provide a combination dosage unit are: phenacetin, aspirin, sodium salicylate, caffeine, acetaminophen, scopolamine, phenylephrine, hydrochloride, glycerol guaiacolate, chlorpheniramine maleate, belladonna alkaloids, dextromethorphan hydrobromide, ephidrine hydrochloride, and phenylpropanolamine hydrochloride.

Unexpectedly good results are obtained when an alkali metal salicylamide salt is combined with an alkali or alkaline earth metal salt of acetominophen having the formula:

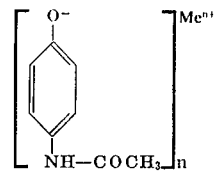

wherein Me is an alkali or alkaline earth metal cation of valence $n$ and $n$ is 1 or 2. Such dosage forms, containing salts of both drugs, are prepared in a conventional manner, as described above. The mole ratio of the salicylamide salt to the acetominophen salt can vary in the range of 0.25:1 to 4:1 but the total unit dosage amount of drug should be from 50 milligrams to 2 grams. Though one can depart from these ranges, the synergistic effect, resulting in higher blood levels of drug, is not present.

The following examples will serve to illustrate the invention without in any way being limiting thereon.

EXAMPLES 1 and 2

| Components | Weight, Grams |
| --- | --- |
| (1) Sodium Salicylamide (dry powder) | 200 |
| (2) Sodium Bicarbonate (dry powder) | 477 |
| (3) Tartaric Acid (dry powder)* | 252 |
| (4) Citric Acid (anhydrous)* | 147 |
| (5) Nucleating Inhibitor | 15 |

The components (3) and (4) were thoroughly mixed, and the admixture dampened with a granulating agent such as anhydrous methanol or acetone. The damp material was then panned through a No. 14 mesh sieve and dried for 4 hours at 40° – 50° C. Component (5), either polyvinylpyrrolidone having a molecular weight of about 10,000 (Example 1) or methylcellulose having a molecular weight of about 400 – 4,000 (Example 2), was next dissolved into a 1:1 granulating mixture of methanol and acetone. The component (1) was then mixed with the component (2) and the nucleating inhibitor (5) solution added thereto. This damp material was also panned through a No. 14 mesh sieve and dried for 4 hours at 40° – 50° C. Mixing the two different granules provided an effervescent composition suitable for dissolving in water and drinking according to the invention. *The proportions of tartaric acid and citric acid in these examples may be varied, if desired, but their combined acidity must be equivalent to the above total acidity for an approximately 1 Kg. formulation.

Other alkali metal salts of salicylamide can be formulated with a like or different effervescent couple in a similar manner.

To form tablets from an effervescent mixture such as that described above, the mixture should advantageously be in granular form in order that it will be sufficiently free-flowing to be easily fed to the die cavity of the tableting machine employed for shaping the tablets. Powders do not flow freely and these powders should be granulated in some convenient fashion. The usual methods of preparing such free flowing granulations include the heat fusion method, the use of steam or water injection, or the use of a double granulation method.

As is known, when compressed tablets are made according to conventional procedure, lubricants must be added to the granulation to facilitate removal of the tablets from the die cavities of the tableting machine after compression. Exemplary of the conventional tableting machines, there may be mentioned hand punch, rotary and automatic.

Any reasonable size and shape of tablet will yield a satisfactory product.

In summary, effervescent compositions containing alkali metal salts of salicylamide are dissolved in water and then orally ingested to provide substantially higher blood levels, in mammals, of salicylamide than do either non-effervescent compositions containing such salts or any conventional orally administratable dosage unit containing salicylamide itself. Thus, this invention provides that a significant improvement in salicylamide therapy can be effected by directly administering aqueous solutions of alkali metal salts of salicylamide.

While the invention has been described and pointed out with reference to certain preferred embodiments thereof, those skilled in the art will appreciate that various changes and modifications and substitutions can be made without departing from the spirit of the invention. It is intended, therefore, that the invention be limited only by the scope of the claims which follow:

What is claimed is:

1. A composition of matter which effervesces in water to produce an aqueous effervescing solution for oral use as an analgesic, anti-pyretic, anti-inflammatory, or sedative, comprising a unit dosage amount of an alkali metal salt of salicylamide, in an orally acceptable dry pharmaceutical effervescent couple, with an effective amount of polyvinylpyrrolidone, methylcellulose or gelatin nucleating inhibitor that acts to prevent the salicylamide salt from converting in effervescent aqueous solution in water to the free acid which would precipitate out.

2. The composition of matter as defined by claim 1 further comprising an alkali or alkaline earth metal salt of acetominophen.

* * * * *